Aug. 1, 1939.  R. S. BUTLER  2,168,081
METHOD OF REDUCTION
Filed Oct. 19, 1935  3 Sheets-Sheet 1

Inventor
Robert S. Butler
by Parker & Carter
Attorneys.

Aug. 1, 1939.    R. S. BUTLER    2,168,081
METHOD OF REDUCTION
Filed Oct. 19, 1935    3 Sheets-Sheet 2

Inventor
Robert S. Butler
by Parker & Parker
Attorneys.

Aug. 1, 1939.   R. S. BUTLER   2,168,081
METHOD OF REDUCTION
Filed Oct. 19, 1935   3 Sheets-Sheet 3

Inventor
Robert S. Butler
by Parker & Carter
Attorneys.

Patented Aug. 1, 1939

2,168,081

UNITED STATES PATENT OFFICE 2,168,081

METHOD OF REDUCTION

Robert S. Butler, Claremont, N. H., assignor to Sullivan Machinery Company, a corporation of Massachusetts Application October 19, 1935, Serial No. 45,797

27 Claims. (Cl. 83—9)

My invention relates to a method of reducing or crushing materials, for example coal, ores and the like. Among the purposes of my invention are an increase in efficiency of reduction and a minimum use of power, a negligible use of power when the machine is running empty, and a continuous automatic feed whereby the mass undergoing reduction serves to control the admission of new particles to the zone of reduction to take the place of the reduced particles which escape therefrom. Another purpose is the provision of a method in which the load undergoing reduction is, during the reducing cycle, subjected to substantially constant reducing stress or pressure. As an example, I oscillate or reciprocate a compact load of particles through a defined reducing zone, such zone being defined by an oscillated reduction chamber and including the space within the interior of the chamber at any instant and all the other space within the interior of the chamber in the various positions of the latter as it is moved in the course of its oscillation, and subject the load not merely to longitudinal reducing pressure at each change of direction of movement, but subject it to transverse reducing pressure intermediate said changes of movement.

Other objects will appear from time to time in the course of the specification and claims.

The present application includes material divided from my co-pending applications Nos. 759,902, filed on December 31, 1934, and 37,804, filed on August 26, 1935.

I illustrate my invention more or less diagrammatically in the accompanying drawings, wherein—

Like parts are indicated by like symbols throughout the specification and drawings.

Referring to the drawings, Figures 5 to 9 inclusive illustrate the movement of the reducing chamber, the reducing media and the particles undergoing reduction, and Figures 1 to 4 illustrate a practical structure or device for carrying out the method herein described and claimed. Figs. 10, 11 and 12 illustrate modifications.

Figure 1:
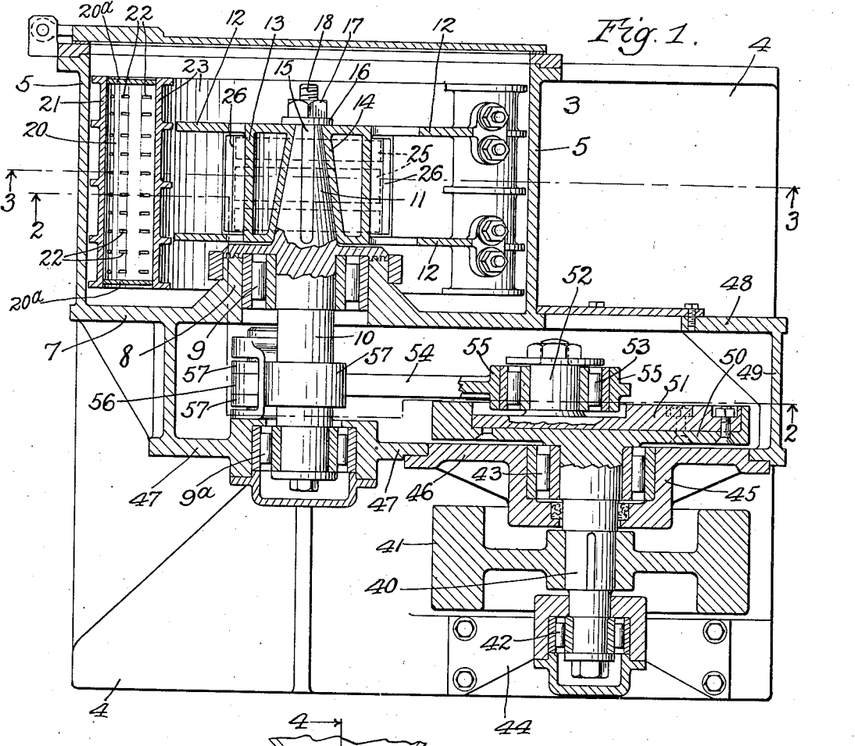
Figure 1 is a horizontal section on the line 1—1 of Figure 2.
Figure 2:
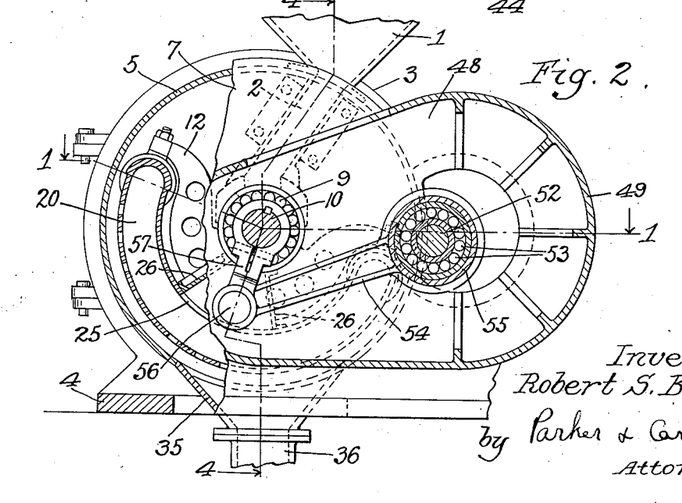
Figure 2 is a vertical section on the line 2—2 of Figure 1.
Figure 3:
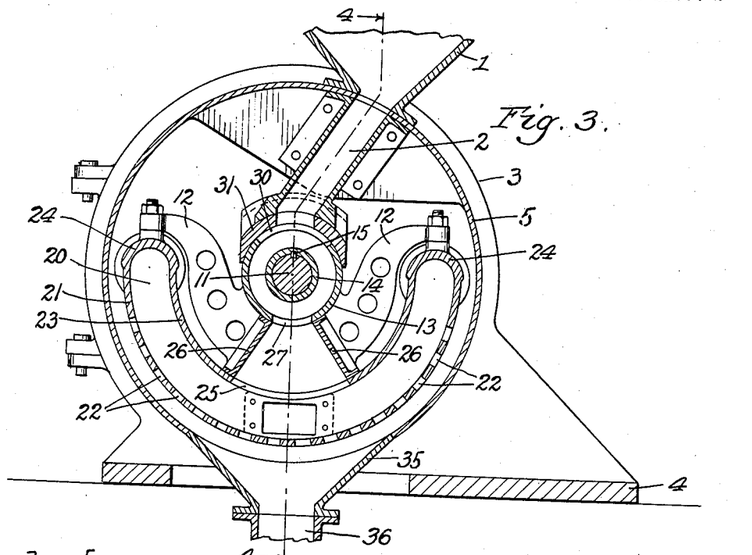
Figure 3 is a section on the line 3—3 of Figure 1.
Figure 4:
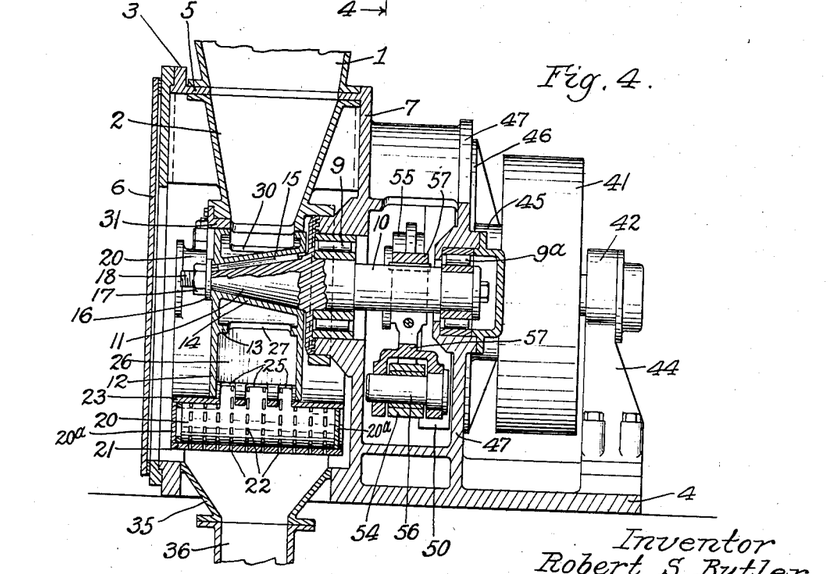
Figure 4 is a section on the line 4—4, indicated in both Figures 2 and 3.
Figures 5, 6, 7, 8, 9, 10, 11, 12:
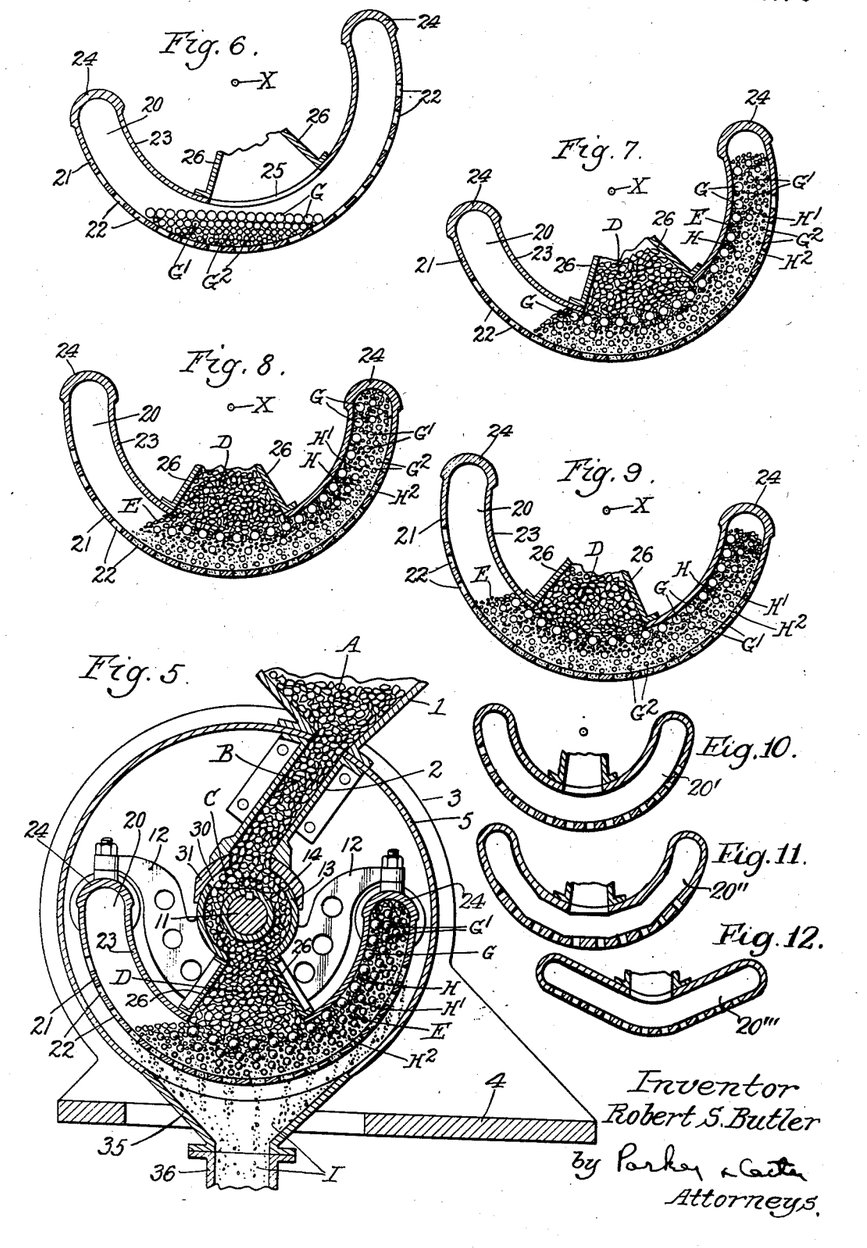
Figure 5 is a section corresponding to the section taken along the line 3—3 of Figure 1, with the material undergoing reduction and the reducing charge included, in order to indicate movement of the material in the course of the reducing method herein described and claimed.
Figure 6 is a vertical, radial section through a reducing chamber, showing the chamber empty except for a reducing charge.
Figure 7 is a similar section, illustrating the reducing chamber at the end of its travel toward the right, with the load moving toward the right just prior to the impact caused by the engagement of the load with the right end of the chamber.
Figure 8 is a similar view after the reducing chamber has reversed its direction and is moving toward the left, carrying the charge with it.
Figure 9 illustrates the reduction chamber moving toward the left, after its velocity has begun to decrease, and with the load moving away from the right end of the chamber and toward the left.
Figures 10, 11 and 12 are fragmentary sectional views showing modifications in chamber structure.

Referring to the drawings, and considering first the movement of the material in the practice of my method, I illustrate, as at A in Figure 5, a mass of material awaiting crushing, which may be supplied in any suitable fashion to the hopper 1. It escapes thence along any suitable fixed chute 2, the material passing down this fixed chute or spout being indicated at B in Figure 5. This fixed spout 2 may be mounted in any suitable fashion in relation to the housing generally indicated as 3, which housing is mounted upon any suitable base 4 and is shown as having a circumferential cylindrical wall 5, an end wall or gate 6, and an opposite solid end wall 7, formed with the bearing supporting sleeve 8 which receives anti-frictional bearings 9 for the shaft 10 to which the below-described reduction chamber structure is secured. The shaft 10 is shown as provided with a tapered end 11 to which is secured what may be called a pendulum structure which includes the outwardly extending yoke or supports 12. Formed integrally therewith is the feed receiving sleeve or stirrup 13 which surrounds, but is spaced outwardly from, the tapered sleeve 14 which is keyed to and is locked against the tapered shaft portion 11, as by the key 15, washer 16 and nut 17 upon the screwthreaded extension 18 of the shaft 10.

Secured in any suitable fashion to the supports 12 is the reduction or reducing chamber proper, generally indicated as 20, which includes an outer arcuate wall 21 provided with apertures 22, an inner annular wall 23, and thickened end walls 24. The annular walls 21 and 23 are herein shown as concentric with the shaft 10, the common center being indicated at X in Figures 6 to 9 inclusive.

The inner or upper wall 23 of the reduction chamber is provided with feed apertures 25 at the outer end of a feed passage which is bounded on two sides by walls 26. The feed passage so formed communicates at its lower end directly with the reducing chamber 20 through the apertures 25 and at its upper end directly with the space between the sleeves 13 and 14 through an opening 27. It will be seen, as in Figures 3 and 5, that the outer sleeve 13 is open at its upper side, as at 30, this opening being masked by the arcuate shield 31 associated with the lower end of the feed spout 2. The outer sleeve 13 at its lower side has the opening 27 communicating through the feed passage with the apertures 25. It will be clear, as from Figure 5, that the mass of feed material B is in communication with, and rests upon the mass of feed material C within the sleeve 13. This in turn rests upon the mass of feed material D in the feed passage defined by the walls 26. By reason of the sweeping of the upper surface of material C, as the reduction chamber swings, back and forth beneath the lower end of the column of material B, there will be a size-reducing operation effected.

The load in the reduction chamber 20 is generally indicated as at E in Figures 5, 7, 8 and 9. The charge of reducing media, shown as stratified or classified, for reasons which will later appear, includes balls or particles of maximum size G, particles of intermediate size G—1 and particles of minimum size G2. These have associated with them, and work against, particles undergoing crushing of maximum size H, intermediate size H—1 and minimum size H2. The fully reduced particles escape through the apertures 22 in the lower or outer reduction chamber wall 21 and are indicated as at I, falling within the housing 5 and into the discharge hopper 35 which communicates with any suitable discharge spout or chute 36.

In the employment of the herein described and illustrated structure for the practice of my method, I impart a rotary oscillation to the reducing chamber 20 about the axis X of the shaft 10. This movement might be imparted to the reduction chamber in a variety of ways, but I illustrate means for obtaining this oscillation, for example in Figures 1 to 4.

40 indicates a drive shaft which is keyed to the drive pulley 41, about which may pass any suitable belt, to a power source not herein shown. The shaft 40 may be supported for example in anti-frictional bearings 42 and 43. The bearings 42 are mounted on any suitable support 44, secured to the base 4. The bearings 43 are mounted in a sleeve 45, herein shown as formed integrally with a closure plate 46 secured in any suitable manner to the general vertical housing wall 47 in which, also, the shaft 10 is rotatably mounted as by the bearings 9a. The opposite side of the housing so formed is closed, as by the wall 7 of the reduction chamber housing 5, which wall extends outwardly as at 48 and is connected to the wall 47 as by any suitable side and end wall structure 49.

Positioned within the housing so formed, and formed integrally with the end of the shaft 40, is a disc 50 to which is adjustably secured, for rotary adjustment, an inner inset disc 51. Outwardly projecting from this inset is the eccentric stud 52 surrounded by the anti-frictional bearings 53 which in turn are surrounded by the eye 55 of an oscillating arm or connecting rod 54. This arm is pivoted at its outer end as at 56 to a crank arm 57 secured to the shaft 10. It will therefore be understood that when the shaft 40 is rotated in response to any suitable driving connection, the discs 50 and 51 rotate and move the stud 52 through a circular path. This circular movement is converted, by means of the connecting rod 54 and arm 57, to a rotary oscillation of the shaft 10. This oscillation is in turn imparted to the reduction chamber 20, the feed passage extending thereto and the sleeve 13. The sliding connections between the sleeve 13 and the shield 31 maintains a continuous and uninterrupted connection with the mass of material A and B sliding from the hopper 1 down through the feed spout 2. Thus the reduction chamber may be continually oscillated without in any degree interrupting the feed of material thereto.

It will be realized that whereas I have more or less diagrammatically illustrated a particular structure adapted for the carrying out of my method, I can employ other structures in carrying out my method, and the present description and drawings are therefore to be taken as, in a broad sense, illustrative or diagrammatic, rather than as limiting me to the precise steps herein described and illustrated or to the use of the particular structures herein described and shown.

The use and operation of my invention are as follows:

The broad outline of my method will readily be understood, for example in connection with Figures 5 to 9. The material to be reduced is fed from a hopper 1, through a fixed feed spout 2, to and through an oscillated sleeve 13, which in turn communicates with the oscillated feed passage bounded by the walls 26. From this passage the material passes directly to the reduction chamber 20.

The material through the entire line of feed follows a continuous path. The feed material A, B, in the fixed feed hopper and spout 1, 2, rests upon the material C in the oscillated sleeve 13, which is continuous with the mass D in the oscillated feed passage. This entire line or column of feed material rests upon the top of the load E, and the load serves as the means for regulating the feed of new particles to take the place of the particles undergoing crushing, because the load, as is clear, for example from Figure 5, masks or underlies the bottom of the feed passage bounded by the walls 26.

In order to make the operation and characteristics of my method clear, I will outline briefly, under various heads, the most important characteristics.

*Reciprocating a load of media and material.*—The oscillation or reciprocation of the reducing chamber 20 reciprocates a load which includes the particles to be reduced and particles of reducing media. The particles or balls of reducing media, G, G—1, G2, are scattered through the mass E of particles undergoing reduction, as shown in Figure 5. As the chamber 20 changes its direction of rotation, its right-hand end 24 receives the impact of the load, and causes the load also to change its direction of movement. In Figure 7 the load is about to engage with the right hand end 24 of the chamber 20. In Figure 8 the load is being moved toward the left with the chamber. In Figure 9 the chamber has begun to slow down and the load is still moving to the left. It will continue to move to the left until it engages the left end 24 of the chamber. This engagement will force the load to move to the right, and this cycle of movement of the load continues as long as sufficient new particles are added to the load to maintain the process. The reduced particles I escape through the apertures 22 of the wall 21 and may pass down the hopper 35 and the discharge spout 36.

*Load confinement.*—The chamber 20, at its various positions in the course of its oscillation, defines a reduction zone which includes the interior of the chamber at all normal positions of the chamber. In this reduction zone an intermittent centrifugal thrust is maintained downwardly toward the bottom of the zone. The material travels from end to end of the zone with a periodic change in the direction of movement caused by the oscillation of the reduction chamber 20. The interior of the chamber proper may be described as a zone of restriction, which is moved through and contained in the larger reduction zone. The load as a whole is confined in close association with the walls of the chamber 20. It is essential for maximum efficiency, that the general motion of both the reducing media and the material undergoing reduction be confined to a path which conforms generally to the path of the load as a whole, that the particles undergoing reduction may be held in contact with the particles of the reducing medium. Wandering of the load or freedom of movement is destructive of efficiency and is prevented by maintaining the load as a relatively compact mass. The cross-section of the chamber 20 along the path of movement of the load is therefore desirably, for some purposes, uniform, and the cross-sectional area at least should be, so far as practicable, maintained substantially uniform. Since in the practice of the invention uneven wear of at least the outer chamber wall 21 may be anticipated, it will be appreciated that maintenance of an approximation of uniformity of cross-section and of cross-sectional area is all that can be expected. With the maintenance of cross-sectional area approximately uniform, the only displacements of the bounding surface of the load are those due to compression at the reversals of direction of the load and to centrifugal force. There is a permitted internal displacement going on all the time, because the constituents of the load are never at rest, but the cross-sectional area of the load as a whole approximates uniformity, and in the structures illustrated for use in the practice of the invention there may be, unless and until wear affects the situation, a maintenance of the cross-section substantially constant along the path of the load.

*The reducing action continues throughout the cycle.*—The reducing action is a compound one. It is not limited to the impact or pressure caused by the reversal of direction of the load at each reciprocation. It continues throughout the stroke in the form of radial or tangential pressure primarily against the bottom 21 of the chamber 20. In the particular structure shown in the present specification, this continuing reducing pressure or thrust results, for example, from the centrifugal action caused by the rotary oscillation of the chamber 20 about its pivotal axis. The time represented by the reversals of direction is only a fraction of a cycle, and to continue the reducing action throughout the stroke, something must be provided for the charge to work against. By employing an arcuate bottom 21, and by oscillating the chamber 20 as a whole about the center X, I compel the load to move as it were uphill whenever it moves in relation to the chamber. This causes a tangential thrust or pressure, and thus we can say that the load is subjected to three different reducing actions. There is in the first place the radial centrifugal pressure of the load against the lower portion of the chamber 20. There is the tangential pressure caused by movement of the load in relation to the chamber 20, which causes the load to climb up the ends of the chamber. Finally, there is the impact or compression of the load against the chamber end. At all times, during the cycle of reduction, the load is being pressed against a reacting member which causes pressures to be set up within and on the load. It is probable that some 75 per cent of the capacity, in my method, is produced by pressures operating between the actual reversals or terminal impacts. I find the employment of an arcucuate bottom or chamber a convenient instrument for the employment of my method. The arc of the chamber need not coincide with the arc of travel of the chamber, as is indicated by the chamber 20' of Fig. 10 whose pivot, indicated by the small unnumbered circle, is below the center from which the arc of the chamber is swept, and there is room for much variation in contour. While I prefer a chamber having curvilinear bottom and top walls, it is within the spirit of my invention to employ walls having parts at slight angles to each other as indicated in the construction of chamber 20" in Fig. 11; or to employ a chamber having upturned ends which need not be curvilinear, as illustrated by the construction of the chamber 20''' of Fig. 12.

*Stage reduction.*—A further advantage and effect of my method, and one which contributes to the ready escape of the reduced particles from the chamber 20 through apertures 22, is the inherent classifying action due to centrifugal force. All particles are thrust centrifugally toward the wall 21 during the intermediate portion of each stroke. The reversal of movement at the end of the stroke, with its interruption of the centrifugal and the tangential thrust above discussed, allows the particles to re-arrange themselves. As the smaller particles are denser for a given volume than the larger, they tend to displace the larger particles toward the center, and to monopolize the periphery or exterior or bottom of the crushing zone, because their size permits readier outward penetration in a radial direction. This centrifugal force tends to drive and to hold every particle out as far from the center of rotation or oscillation as it can go. As will appear, for example in Figures 5 and 7, the fine particles G2 of the media and H2 of the work, crowd out against the wall 21. The intermediate sized particles G—1 of the media and H—1 of the work, occupy an intermediate zone or stratum. The largest particles G of the media and H of the work, are stratified at the top of the crushing zone. As reduction takes place, the finer particles sift or escape downwardly through the load and pass out through the apertures 22. The tendency of centrifugal force to move the smaller and denser particles to the periphery is made relatively easy by the continuous reversals of direction of the load as a whole, which favor the progressive reorganization of the particle structure of the load.

*Force feed, passage, and discharge.*—The intermittent centrifugal thrust upon the material undergoing crushing supplements the gravital movement of particles to the reduction zone, through the reduction zone, and out of the reduction zone, all in connection with the above described classification reduction. The centrifugal force acts on the material D between the passage walls 26 of the feed passage. This mass of material, which is under constant gravital thrust downwardly against the load, has its gravital thrust intermittently strengthened by a centrifugal thrust. It takes considerable force to drive the feed against the tightly packed mass of balls and particles of the load. When sufficient of the finer particles have escaped to shorten the load and to permit a slight unmasking of the feed aperture bounded by the walls 26, it takes force to drive the feed through this opening in the short time that it is uncovered at the ends of the stroke. This centrifugal action not merely contributes to the feeding thrust and to the carrying of the reduced particles through the load as a whole, but contributes to the tendency of the reduced particles at the bottom of the load to escape through the passages 22. As above pointed out, this centrifugal thrust would not be so effective if it were not discontinuous. Every reversal of direction of the load E, and of the feed mass D, permits rearrangement of particles and contributes radically to the efficiency of the centrifugal or tangential thrust. Their conjoint and successive action is an important feature of my invention, and contributes greatly to the efficiency of my method.

*Self regulation of feed and volume.*—In my method I provide a constant and self-regulated feed. This is of vital importance, because, by using it, I avoid loss of efficiency by underfeeding, with no possible risk of overfeeding. The entire line of feed, including the bodies of material indicated at A, B, C and D in Figure 5, exerts a cumulative pressure upon, and body D actually rests in part upon, the top of the charge E. The material in the hopper 1 can be piled as high as the operator wishes. The passage 2 may be constantly choked and the entire mechanism run at so-called "choke feed". No matter how high the material may be piled in the hopper 1, there is no possibility of choking or overfeeding the reduction chamber 20. The load or chamber contents regulates the entrance rate at every instant. I obtain this result in part by employing a form of chamber such that the load fills the chamber cross-sectionally throughout the length of the load. My preferred way of obtaining this result is to employ a reduction chamber 20, the cross-sectional area of which approximates uniformity and which desirably is substantially constant throughout its length. The load E moves bodily back and forth along the chamber 20 without deformation of its bounding surface. The intake passage bounded by the walls 26 is of such length, and is so located that the load itself blocks the inlet when the load volume is at a predetermined maximum. This prevents the penetration of additional particles until sufficient reduced particles have been discharged to make room for such additional particles. The instant that enough particles have been discharged to permit the addition of new particles, such new particles are delivered into the charge from the waiting mass D, by gravital thrust or by the reinforcing centrifugal thrust.

*Avoidance of short circuit.*—Another result of the employment of my method, effective in connection with the automatic feed control and the classified reduction above discussed is that it renders practically impossible the passage of unreduced particles through the reduction zone. Virtually all the material admitted from the mass D must pass through the load and through the crushing media from top to bottom, before escaping from the apertures 22. The small part of the material that enters at either end of the load is caught by the oncoming edge of the load E and is pushed against the chamber wall or the chamber end, or both. I maintain the rate of reciprocation or oscillation of the chamber so high that this end material cannot drop through the chamber 20 before the load as a whole, or the crushing medium, overtakes it. This is particularly the case, since the load as a whole is maintained relatively compact and solid, filling up the entire cross-sectional area of the chamber 20 throughout the length of the load. As a result of this prevention of "short circuiting" the size or quality of the product is independent of the frequency of oscillation. This is of importance, as freeing me of the necessity of closely adhering to an optimum speed, a matter of necessity in conventional ball and impact mills.

*Product size control.*—In my employment of a relatively confined or compact load, not only do the constituent particles have a generally fixed relation to each other, as they classify by size, but the same is true of their interstices. I provide sufficient movement within the charge itself to prevent stagnation and to make possible the passage of the particles through the charge. I obtain this result by my alternation of longitudinal and transverse reduction pressure. When the particles classify or stratify by size, as they do, as shown for example in Figure 5, the lower stratum composed of the small media particles G2 and the small work particles H2, serves as a sizing bed because of the small size of the interstices between particles. Only particles small enough to pass through the interstices of this layer can escape through the apertures 22. Similarly, the higher strata of media and particles size or control the particles passing through to the lower part of the reduction zone. The product ultimately passing through the media is substantially uniform in size, and this size is controlled by the size of the media particles. The work particles of each stratum escape to a lower stratum as soon as they are reduced to a size substantially below the size of the media particles of that stratum. Therefore, by altering the size of the media, I can alter the size of the interstices, and control the size of the particles passing through and discharging from the load. All that is necessary in order to effect such a change, is to change the size of the media in the chamber 20.

*Pumping action.*—The form of my chamber 20 being such that the load fills it in cross-section, a pumping action is developed at each end of the chamber at each reciprocation of the load. The load acts like a piston within the cylinder-like chamber. This pumping action serves a two-fold purpose; first, in forcing out material which has been reduced to proper size, thus promoting discharge; and second, compressing air or other gas remaining in that portion of the chamber, which compression serves to take up some of the shock of contact.

*Power saving at no load.*—Inasmuch as the charge is of small volume in relation to the cubic content of the reduction chamber 20, as shown in Figure 6, and since, owing to the curvilinear shape of the chamber bottom 21, the charge tends to stay in the bottom of the chamber 20, out of contact with the ends 24, I am able to avoid any working contact between the media and the ends 24 of the chamber 20 when the chamber is running empty, or if the load falls below a predetermined minimum. In other words, with insufficient material present, the bottom of the chamber 20 will travel beneath the medium but the oscillation of the chamber will be insufficient to cause the reduced load to engage the chamber ends 24. The load is held by gravity in an intermediate or idle position. No reduction takes place, and no wear, other than the slight wear against the bottom 21. And, what is exceedingly important, no power is consumed except the frictional power of the mechanical system. But this "no load" operation involves no delay in the resumption of normal operation. When sufficient material enters to build up the load volume to a size where the ends of the chamber engage the load, action starts again, and reduction takes place and continues as long as enough material passes down between the inlet walls 26 to maintain a sufficient load in the chamber 20. This action is so sensitive, and so certain, that in practice I have been able to cause a mill to operate for a second or two on full load, followed by a second or two of no load. A few cubic inches of volume, at the critical point, is enough to throw the machine from full load to no load or from no load to full load, the period of building up or dopping off amounting only to a second or two. In the use of my invention the power consumption is more nearly proportioned to the work done than in any other method known to me. In practice the no load power consumption need not be over ten per cent of the full load power consumption.

While the feature just described has the distinct advantages pointed out, it will of course be understood that the volume of media may be varied at the will of the operator by adding or subtracting balls; and, in any event, the employment of my invention, in its broader aspects, is not dependent upon the employment of any particular or predetermined volume of media.

*The feeding arrangement.*—I find it desirable to feed my oscillating mill near the center of oscillation. The feed opening defined by the walls 26 has the same angular amplitude of movement as the chamber 20. But whereas the charge is reciprocated through a very substantial arc in the chamber 20, the material in the feed passage is constrained to a much smaller arc by the confining walls 26. The feed mass D, therein contained, is not permitted to agitate, and by plugging up the whole feed passage, prevents any unintended retrograde escape of particles from the charge E. It serves as a seal for the top of the chamber 20, and assists in maintaining the charge in its desired compact condition.

The shield 31 and the sleeve 13 are advantageous in maintaining a constant feeding connection. The opening is never closed or obstructed, even at the extreme ends of the stroke.

In causing the mass D to serve as a plug or seal for the inlet opening to the chamber 20, I find that employing tapered walls 26 is advantageous. There is no chance for material from the chamber 20 to escape when the mass of material D is present. In the event that this material is used up by underfeeding, the tapered sleeve 14 still serves as a baffle. The escape of balls or material is effectively prevented.

*The mechanics of my apparatus and method.*— In my opinion, the major reduction I obtain results from the lateral thrust against the walls, and especially the bottom wall 21, of the chamber 20. Pressure on material being reduced is necessary for reduction, but pressure accompanied by movement is vastly more effective than pressure alone. I provide both to a high degree. The centrifugal or radial pressure is due to the partial rotative motion of the load about the axis of oscillation of the chamber 20. It results in a radial compression of the load, due to its mass, radius and velocity, which is greatest at each stroke when the other pressures below described are at a minimum. My second source of reduction is the inertial or longitudinal pressure developed by the reversal of the load due to the reversal in direction of movement of the chamber 20. It is not a mere impact, but is smoothed out and extended. Instead of moving my load, without choke or drag, between changes of direction, I subject it to a constant pressure intermediate its reversal of direction, as above described. I employ not merely the direct radial thrust or pressure above discussed, but the tangential thrust of the load when it moves in relation to the chamber. It tends to move rectilinearly or tangentially, but is constrained to follow the arc and not the tangent. This tangential thrust, which precedes the terminal impact, robs the terminal impact of some of its sharpness, and also returns to the power source some of the energy put into the mass during the acceleration. The changes in thrust resulting from the alternation between longitudinal or inertial pressure and transverse (radial or tangential) pressure, promote settling and limited movement in the mass without allowing the mass as a whole, or its constituent parts, to move freely about. Another contribution to longitudinal pressure results from my employment of a relatively long load, analogous to the effect of a long string of freight cars. The very length of the load increases the time during which the impact resulting from the reversal of direction is felt through the load as a whole.

By the employment of these various features I am able vastly to reduce power use and power costs, while increasing reduction efficiency. I am able to obtain very accurate sizing, and to vary my sizing at will. In my sizing and in my reduction results I am not closely limited to an optimum rate of oscillation.

It will be understood that whereas I have illustrated a mechanism in which the reduced particles pass down a hopper 35 to an outlet 36, any suitable means may be employed to return oversize particles, if any, for recrushing. Such an arrangement is shown in my copending application, Serial No. 37,804, of which this present application is a continuation in part; and it will be understood that my invention is not limited to single pass reduction, but is equally applicable to closed circuit reduction in which part or all of the discharged material is returned to the reduction chamber for further reduction.

It will be understood that when, in the claims, I specify that the reducing chamber is of uniform cross-sectional area from end to end, I am alluding to the ends 24 against which the load abuts and to the substantially constant distance separating the walls 21 and 23, and not to the side walls 20a.

And it will further be understood that whereas in the specification or claims I describe the reduction chamber as being substantially uniform or constant, or generally or approximately uniform in cross-section or in cross-sectional area, from end to end thereof, I wish such terms to be used with sufficient flexibility to include not only slight variations in cross-sectional area from point to point along the chamber, such as are inevitable under ordinary manufacturing conditions, but also variations in cross-sectional area resulting from inequality of wear, if any.

And whereas it is desirable that said chamber be of generally constant cross-sectional area from end to end thereof, it will be understood that I consider within the scope of my invention slight variations in cross-sectional area to a degree insufficient to impede or change the character of the reduction which takes place in such chamber or to preclude the described operation of the chamber contents in regulating feed.

While I have in this application specifically described one form of means, and three modifications, by which my invention may be practiced, it will be understood that these have been shown for purposes of illustration and that the invention may be modified and practiced by means of various other forms of apparatus without departing from its spirit or the scope of the appended claims.

I claim:

1. The method of reducing the size of material which comprises enclosing the same with a free reducing medium in a zone of restriction which is movable back and forth in a reduction zone which is transverse adjacent its mid point to a vertical plane, effecting movement of the resultant mass back and forth substantially as a unit in said reduction zone while maintaining the same in compact form substantially filling the cross section of said zone of restriction, discharging material from the reduction zone substantially continuously, and introducing new material into the reduction zone during the reducing process in a direction transverse to the path of movement of the mass and through a feed opening intermediate the ends of the zone of restriction, controlling the introduction of new material to said reduction zone automatically by the mass within the latter to maintain the length of the unit mass such in relation to the length of the zone of restriction and said reduction zone that while in an intermediate position in the latter zone it is simultaneously spaced from each end of the zone of restriction, and when adjacent each end of said reduction zone contacts an end of said zone of restriction, and in all positions during normal size-reduction exercises a feed-controlling cooperation with said feed opening.

2. The method of reducing material which includes moving a load of which the material forms at least a part, along a defined path which is transverse adjacent its mid point to a vertical plane and substantially confining the load in the form of an elongated body, in a chamber approximating uniformity in cross-sectional area, during the travel of the load in such path, while maintaining the load length less than the length of said chamber but sufficient to attain to the ends of the latter in alternation, by continuously discharging finely reduced material from said load and substantially continuously supplying additional particles to be reduced to said load, at a point spaced from both ends of the chamber and in a direction transverse to the path of load movement at the point of supply, in automatic response to the discharge of the reduced particles, as space for the introduction of new particles is provided following elimination from the load of reduced ones.

3. The method of reducing material which includes moving, in a size-reducing chamber, a load of which said material forms at least a part, bodily along a defined path which is transverse adjacent its mid point to a vertical plane, into contact with the opposite ends of the chamber in alternation, while maintaining said load in a substantially compact mass elongated along said path but of materially less length than the latter and said chamber, and of substantially uniform cross section throughout the greater portion of its length, continuously withdrawing finely reduced material from said load, maintaining a mass of material resting upon said load at a point which is in spaced relation to both ends of said chamber, and substantially continuously supplying additional particles to be reduced to said load from the mass of material resting thereupon while utilizing the coaction of the load with said mass in the regulation of load volume.

4. The method of reducing material which includes moving a load of which said material forms at least a part, in the form of a relatively compact mass contacting with and shaped by the sides of its path, along a defined path whose cross section for a substantial portion of its length said load at all times substantially fills and which is so disposed that the load shall have upper and lower sides extending longitudinally of said path, substantially continuously withdrawing the finely reduced material from the lower side of said load, substantially continuously supplying additional particles to be reduced to the upper side of said load in a direction transverse to the movement of the latter at the point of particle supply, and employing the load itself as a moving barrier to control the admission of additional particles.

5. The method of reducing the size of material which comprises mingling the same in an elongated chamber with free masses of reducing media and moving the resultant mass alternately in opposite directions in an arcuate path along its chamber walls under substantially complete peripheral constraint laterally of said mass, effecting discharge of reduced material, feeding material to be processed to said mass in a direction generally radially with respect to the path of movement of the latter, and controlling the introduction of further material to be reduced automatically by the changes in volume of said resultant mass as reduced material is eliminated therefrom.

6. The method of claim 5 in which the introduction of further material is automatically controlled, at least in part, through the feed of new material at points similarly related to each end of the path and the restriction of the length of the mass so that in the opposite extreme positions of the latter said feeding points may alternately be effective, by the provision at the opposite ends of the resultant mass, as the volume of the latter diminishes, of spaces for the ingress of further material.

7. The method of reducing the size of material which includes introducing into a size-reducing chamber which is considerably elongated compared with its dimension normal to its path of movement in the planes of movement, material to be reduced as rapidly as the chamber load permits, utilizing the load, through the coaction thereof with material awaiting ingress to the reducing chamber, as a valve to preclude complete chamber filling, and moving said chamber at a velocity and with an amplitude adequate to effect compacting of the chamber load alternately against the opposite chamber ends and filling of the chamber substantially from top to bottom and from side to side for substantially more than half but less than its entire length.

8. The method of reducing the size of material which comprises feeding the same through a feed opening spaced from the ends thereof into an elongated size-reducing chamber of such length relative to its cross-sectional dimensions and reciprocated at such speed and with such amplitude that the load contained therein moves from end to end thereof as a substantially compact mass, at most points in its length filling the cross-sectional area of the chamber and when compacted against either end of said chamber having its own relatively opposite end spaced from the other end of said chamber, and controls the introduction of the material into the chamber through said feed opening.

9. The method of reducing the size of material, which consists in reciprocating in a reduction chamber which is of relatively great length in comparison with its dimension normal to its path of movement and which confines the load therein to movement as a substantially compact mass, material to be reduced in size, in a load sufficient substantially to fill the complete cross section of the chamber throughout at last half of its length but for less than the full length thereof, discharging material as the same is reduced in size, and substantially continuously introducing, in a direction transverse to the path of load movement at the point of material introduction, new material into the load, while automatically controlling its entrance thereto by the load within such chamber to preclude complete filling of said chamber from end to end thereof.

10. The method of reducing material which includes mingling with said material a charge of reducing medium consisting of particles of varying sizes and reciprocating the resultant mass in an elongated chamber as a substantially compact load, subjecting the load successively to centrifugal and to longitudinal pressure to effect a classification and stratification, by size, of the particles of the medium and of the material undergoing reduction, feeding to one side of the load additional particles to be reduced, along the general direction of centrifugal thrust, automatically controlling such addition by the load to preclude choking of the chamber, and withdrawing the reduced particles from the opposite side of the load.

11. The method of reducing material which includes subjecting to reducing pressure and to movement alternately in opposite directions in a path which extends transverse to a vertical plane, in a zone of reduction, a compact load of material mixed with a reducing medium having particles of graded sizes, and maintaining lateral reducing pressure on the load intermediate changes in direction of movement of the load and confining the load at the periods of reversal of its movement to effect and maintain stratification, by size of particle, in the reducing zone, with the smallest particles of media and material at the bottom and the largest at the top.

12. The method of reducing material which includes enclosing a quantity of size-reducing media of graded sizes in a reduction chamber of such length and cross-sectional conformation and moved in such a path at such peed and with such amplitude that the contents thereof tend to stratify according to size, and when present in adequate volume are caused to travel in a substantially compact mass alternately in opposite directions within said chamber, introducing material to be reduced into said chamber at a point where the largest media predominate, and discharging the material after its size is reduced at points where the smallest media are the most numerous, using the stratified media to provide graded size-reduction and to control the sizes of the material particles in passing from introduction to discharge.

13. The method of reducing material which includes reciprocating a quantity of pieces of said material, in a unitary mass of which said pieces of said material form at least a part, along a curvilinear path and thereby subjecting said material to lateral pressure at the outer boundary of said path, and terminating each traverse of the mass with an impact, confining said mass along the longitudinally extending boundaries of such path at each impact and also during intermediate passes along said curvilinear path so that said mass is substantially continuously maintained in an elongated body of substantially uniform cross-sectional area substantially filling the full cross-sectional area of said path throughout the major portion of its own length.

14. The method of reducing material which includes reciprocating a load of which said material forms at least a part, along a curvilinear path, while maintaining said load substantially compact, subjecting said entire load to longitudinal pressure at each change of direction, and subjecting it simultaneously at all points in its length to radial and tangential pressure intermediate its changes of direction.

15. The method of reducing material in size which includes reciprocating bodily a generally compact load of which the material forms at least a part, in a reduction zone along a defined substantially arcuate path while constraining the same against movement transverse to such path except as size-reduction takes place, supplying material to said path at points spaced inwardly of its outer boundary and intermediate its ends, and providing, through restriction of load length through the feed-restricting action of the load at said points of material supply, during the reciprocation of said load, for intermittent periods of free travel of said load during which the movements along said path exceed the radial dimension of said reduction zone.

16. The method of reducing the size of material which consists in introducing it into an oscillated chamber having upwardly concave top and bottom walls with a feed opening between the ends of its top wall, and which chamber approximates uniformity in cross section and is of smaller radial dimension than the radius of its bottom wall, and oscillating said chamber through such an arc that its upper wall at its center is materially below the chamber ends in the mid position of such chamber, and at such a rate that said material is subjected to impact action alternately at the opposite ends of the chamber and, intermediate such impacts, to centrifugally produced pressure radially against the bottom chamber wall and to tangential thrusts or pressures against such bottom wall, and acts to control feed ingress to preclude complete filling of the chamber.

17. The method of reducing the size of material which includes supporting it in a load less than sufficient completely to fill the chamber, but at all times during normal size-reducing operation filling a substantial part of the length of the chamber throughout its full cross section, in a chamber of approximately uniform cross-sectional area between its end portions, upon an arcuate surface, and oscillating the chamber to cause said arcuate surface to move about an axis in which its center of curvature lies, at a speed to cause the load to exert a radial centrifugal pressure against such arcuate surface, and with an amplitude to cause the chamber ends in alternation to engage and reverse the motion of the load.

18. The method of reducing material which includes reciprocating along a defined path whose ends are at opposite sides of a vertical plane, a substantially compact load comprised at least in part of material to be reduced in size and of a relatively predetermined length, in a reduction chamber of such length that said load may in an intermediate position be simultaneously spaced from each end of such chamber, delivering material to be processed to said chamber at a point between the ends thereof, and maintaining the volume of the load, through its own coaction with material awaiting entry to the chamber, such in relation to the cross-sectional area of said reduction chamber that the latter is substantially filled throughout the length of said load when the latter is in said position and that said load at all times during the normal size-reducing operation at least partially masks the points of material delivery to the chamber.

19. The method of reducing the size of material which includes maintaining, in a zone of restriction of a predetermined length and a lesser predetermined height and having provision for the discharge, during the continued size-reducing process, of size-reduced material, through the substantially continuous replacement of size-reduced material discharged from said zone, a relatively compact load of such length that free travel thereof in said zone is possible, and of such height that said zone is completely filled in cross section throughout the central part thereof at all times during the normal size-reducing operation, and causing reciprocation of said load in said zone, each pass of said load in said zone including a period of free bodily movement, terminating in an impact with an end of such zone.

20. The method of reducing material which includes maintaining, in an elongated zone of restriction in a reduction zone extending transversely to a vertical plane and higher at its ends than at its longitudinal center, a load of which particles to be reduced form at least a part, moving the entire load along said reduction zone and periodically changing the direction of movement of said load in said reduction zone, maintaining the volume of said load sufficient, in relation to the cross-sectional area of said zone of restriction, to maintain said zone of restriction substantially filled in cross section for less than its whole but throughout at least half of its length, and to keep said load substantially compact whereby a portion of the length of said zone is clear at all times, and subjecting the load as a whole to centrifugal pressure, intermediate said changes in direction of movement, against a bounding surface of said zone of restriction.

21. The method of reducing material which includes reciprocating a load of which said material forms at least a part, through a reduction zone while maintaining the same in a zone of restriction moving between the ends of said reduction zone, subjecting said load to impact at the end of each traverse during its reciprocation, and subjecting said load to lateral pressure intermediate said impacts, discharging size-reduced material from said zone of restriction during movement of the load therein, and feeding new material into said zone of restriction at a point intermediate the ends thereof and in a direction transverse to the length thereof and, through the feed-controlling coaction of the load with material seeking entrance to the zone of restriction, maintaining the volume of said load sufficient, in relation to the cross-sectional area of said zone of restriction, to keep such zone at all times substantially filled in cross section throughout at least half of but less than its entire length.

22. The method of reducing material which includes maintaining, in an elongated reduction zone extending transversely at its middle point to a vertical plane and of at least approximately the same cross-sectional area throughout the major portions of its length as its cross section upon such plane and having its ends so disposed that a straight line connecting them falls outside the area included within the cross section of said zone in said plane, a load of which particles to be reduced form at least a part, maintaining the volume of said load sufficient, in relation to the cross-sectional area of said reduction zone, to maintain the zone substantially filled in cross section throughout a substantial portion of but less than its entire length, and moving the load along said reduction zone, while subjecting the full length of the load to a pressure resulting from the shape of said zone and the motion of the load therein, against a bounding surface of said reduction zone.

23. The method of reducing material which includes maintaining, in a reduction chamber, a load of particles to be reduced mixed with a reducing medium, reciprocating the load in part with and in part along the chamber walls in an elongated defined path such that the travel of the load is substantially horizontal at the central point in such path, and continuously maintaining the volume of the load sufficient to fill said chamber for its full cross section throughout a portion of but less than its entire length, the reciprocating of the load effected at such a rate as to cause such filling to prevail throughout substantially the full length of the load but materially less than the length of the chamber.

24. The method of reducing material consisting in supporting in a reduction zone, in a load insufficient to fill such zone, material to be reduced and a size-reducing medium, moving said load backwardly and forwardly in said zone along a path whose opposite extremities are at opposite sides of a vertical plane extending transversely to said path adjacent its longitudinal center while subjecting said load to pressure at certain of its bounding surfaces, discharging sufficiently reduced material from said load at at least one bounding surface thereof, and feeding material to be reduced to said zone during the reducing operation, characterized in that the material to be reduced is fed to the reduction zone substantially continuously and in a direction transverse to the movement of the load, through feed ingress means spaced from the ends of said zone, and the volume of the load is so maintained, in relation to the length and the cross-sectional area of the reduction zone, that during the normal reducing operation said zone is maintained at least substantially filled in cross section throughout a substantial portion of but less than its entire length and the load at all times at least partially obstructs the feed ingress means.

25. The method of reducing material which includes maintaining an elongated load of which said material forms at least a part, in a generally arcuate reduction zone which is substantially bisected by a vertical plane, moving the same in said zone to dispose at least the major part thereof alternately at opposite sides of said vertical plane, subjecting the material to successive, oppositely-acting impacts adjacent the opposite ends of said zone, subjecting the material to pressure reduction between impacts, and maintaining the load substantially compact in the zone and of approximately uniform cross-sectional area throughout the major portion of its length as well during such pressure reduction as at impact.

26. The method of reducing material which includes maintaining in, and moving backwardly and forwardly in, an elongated, backwardly-and-forwardly-moving reduction chamber whose extremities are higher, in the median position thereof, than its central portion, a mass composed of a quantity of size-reducing media too small in volume, with the form, velocity and path of movement of said chamber, to contact the extremities of the chamber in the absence of material and a quantity of material sufficient when mingled with the media to produce a cumulative volume such that the opposite ends of the mass are contacted alternately by the ends of the reduction chamber as the latter moves, discharging material of small enough size from the chamber during chamber motion, maintaining a material reserve awaiting entrance to the chamber in a direction transverse to the length thereof and at a point spaced from both ends of the chamber, and maintaining automatically, during the continued maintenance of material ready to enter the chamber, and through direct contact of such material ready to enter the chamber with the mass of material and media within the chamber, the volume of the mass less than sufficient completely to fill the chamber but adequate to contact with each of the opposite extremities of the chamber once during each cycle of backward-and-forward movement of the latter.

27. The method of reducing the size of material which consists in applying to a substantially compact mass of material particles and size-reducing media constrained to movement in a zone whose cross section it constantly substantially fills throughout the major portion of its length, a cycle of steps including imparting to said mass a throw along an arc, constraining the movement of said mass to a continuation of such arc whereby centrifugal, radial and tangential forces act thereon, and after a period of deceleration halting the movement of such mass, with an impact, then applying the same cycle in the reverse direction, and continuing in alternation said cycles.

ROBERT S. BUTLER.